Sept. 22, 1953    J. R. LONGSTREET    2,652,737
CHIP FLUSHING MEANS FOR BEDS OF MACHINE TOOLS
Original Filed March 30, 1945                2 Sheets-Sheet 1
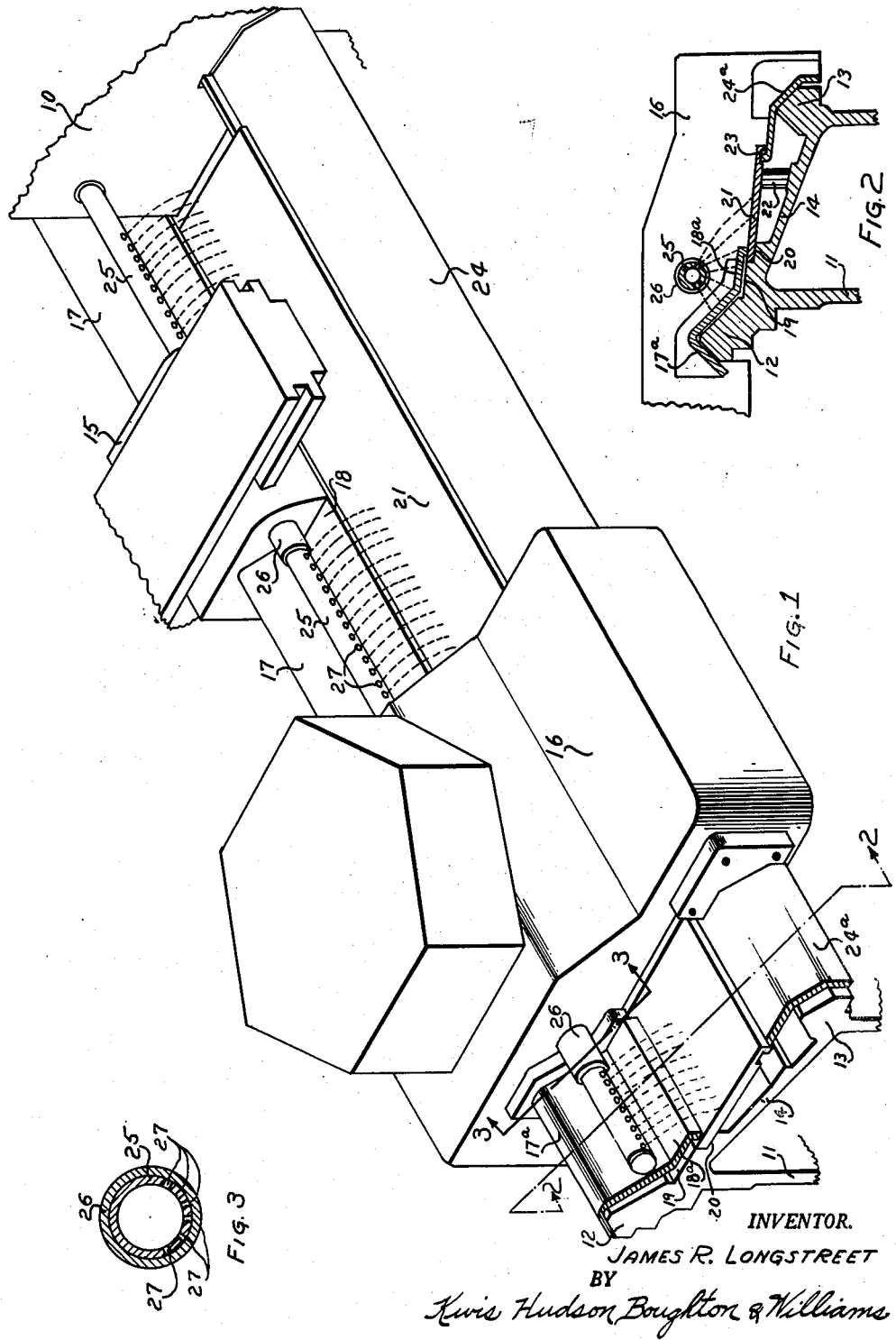
INVENTOR.
JAMES R. LONGSTREET
BY
Kwis Hudson Boughton & Williams
ATTORNEYS Sept. 22, 1953         J. R. LONGSTREET         2,652,737
CHIP FLUSHING MEANS FOR BEDS OF MACHINE TOOLS
Original Filed March 30, 1945                   2 Sheets-Sheet 2
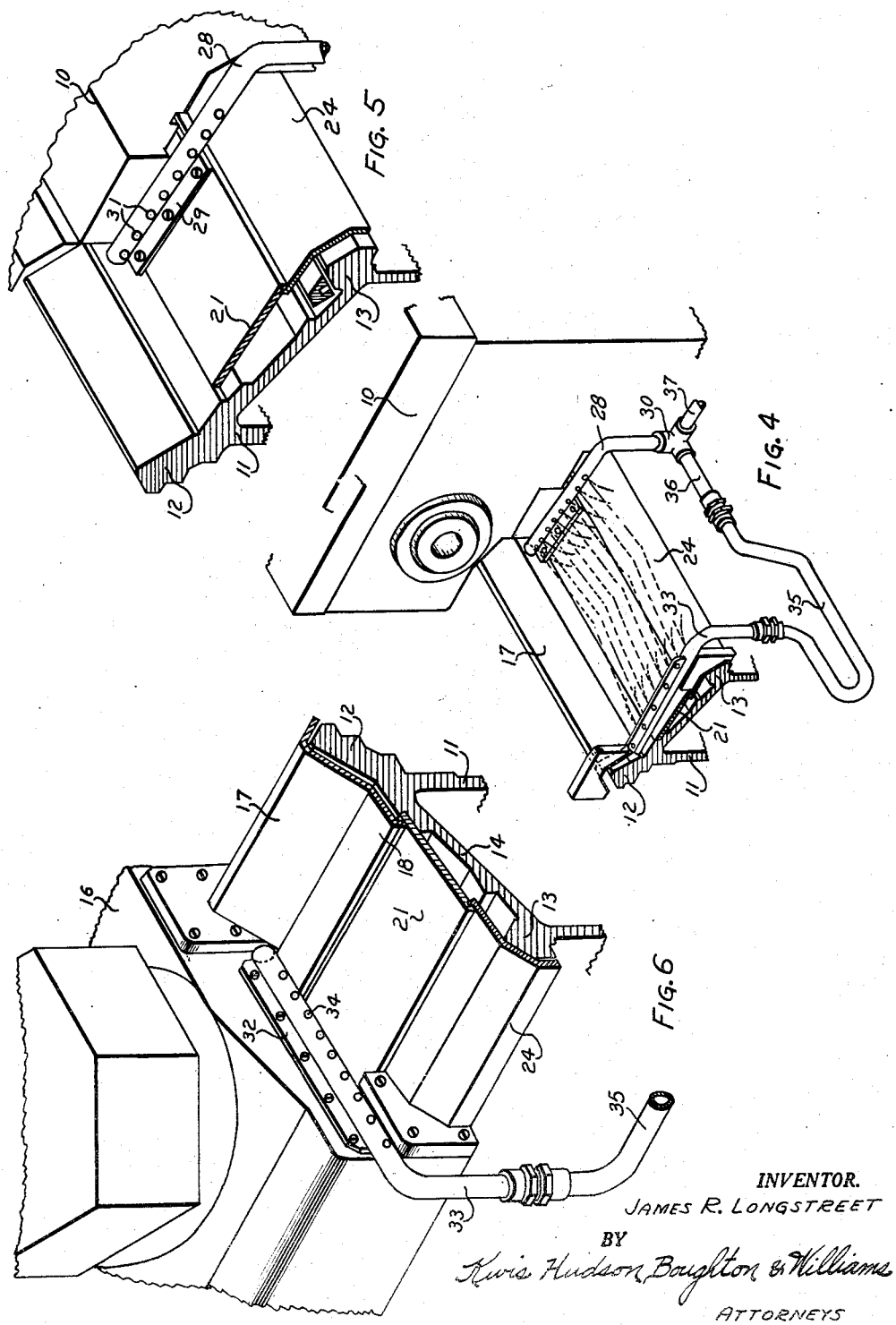
INVENTOR.
JAMES R. LONGSTREET
BY
Kwis Hudson, Boughton & Williams
ATTORNEYS Patented Sept. 22, 1953

2,652,737

UNITED STATES PATENT OFFICE 2,652,737

CHIP FLUSHING MEANS FOR BEDS OF MACHINE TOOLS

James R. Longstreet, Bedford, Ohio, assignor to The Warner & Swasey Company, Cleveland, Ohio, a corporation of Ohio Continuation of application Serial No. 585,716, March 30, 1945. This application June 24, 1950, Serial No. 170,153

3 Claims. (Cl. 82—34)

1

This invention relates to a machine tool and particularly to means for flushing chips, dirt and other foreign matter from certain portions of the machine tool.

This application is a continuation of my application Serial No. 585,716, filed March 30, 1945, now abandoned.

More particularly the invention relates to the provision of means for flushing chips, dirt and foreign matter from the closed top bed of a machine tool and to the rear of the rear way.

An object of the invention is to provide improved and novel means for flushing chips, dirt and other foreign matter from the top of the bed of a machine tool and wherein said flushing means is effective always with respect to the exposed areas of the bed irrespective of the movements of the slide or slides on the bed.

Another object is to provide improved and novel means for flushing the closed top of the bed of a machine tool to remove chips, dirt and foreign matter therefrom and which means is controlled by the movements of the slide or slides on the bed.

Another object is to provide in a machine tool wherein the bed has ways and guard or cover means for protecting the ways and the top of the bed intermediate the ways from the lodgment thereon of chips, dirt and foreign matter, an arrangement for flushing the chips, dirt and foreign matter from said guard or cover means to the rear side of the bed and which flushing arrangement is effective with respect to varying exposed areas of the bed as determined by the movements of the slide or slides on the ways.

A further object is to provide a flushing arrangement as referred to in the last named object and wherein the flow of the flushing liquid is automatically controlled by the movements of the slide or slides to cause the flow to occur over the exposed areas of the bed and to be discontinued over the non-exposed areas thereof.

A further and more general object is to provide in a machine tool improved and novel means for the disposal of chips, dirt and foreign matter and thus to facilitate the operation of the machine tool and to reduce the likelihood of wear of the parts due to chips, dirt and foreign matter working between contacting relatively movable surfaces.

Further and additional objects and advantages not above referred to will become apparent during the detailed description of several embodiments of the invention which is to follow.

Referring to the accompanying drawings,

2

Fig. 1 is a rear perspective view of the bed and a portion of the headstock of a machine tool embodying one form of the invention.

Fig. 2 is a transverse vertical sectional view taken substantially on line 2—2 of Fig. 1 looking in the direction of the arrows.

Fig. 3 is a detail sectional view taken approximately on line 3—3 of Fig. 1 looking in the direction of the arrows.

Fig. 4 is a rear perspective view of a portion of the bed and a portion of the headstock of a machine tool embodying a different form of the invention from that previously illustrated.

Fig. 5 is an enlarged view of the right hand portion of Fig. 4 with the guard member for the front way omitted to clearly illustrate the said way, and Fig. 6 is an enlarged rear perspective view looking toward the left hand portion of Fig. 4 from the right but showing the turret slide in position on the ways of the bed.

Referring first to Figs. 1 to 3 inclusive, the machine tool shown therein is of the larger type wherein the slides have extended movements, and comprises a headstock 10 and a bed 11 which is provided along the front upper edge with a front way 12 and along its rear upper edge with a lowered rear way 13. The bed 11 includes a top portion 14 intermediate the ways 12 and 13 and sloping downwardly and rearwardly from the front way 12 to the lowered rear way 13. The front way 12 extends along the front side of the headstock 10 and is fully covered and protected by a way guard to be referred to later.

A cross slide carriage 15 is slidably supported, in this instance, by the front way 12 and by an auxiliary way on the front side of the bed and with which the apron of the carriage cooperates, not shown since it is well understood in the art. The front and rear ways slidably support a turret slide 16. A guard member 17 is secured to the side of the turret slide 16 which is adjacent to the cross slide carriage 15, as shown in Fig. 6, and said guard member extends through an opening in the cross slide carriage 15. The guard member 17 moves with the turret slide 16 and is so shaped as to overlie and move in spaced relation to the front way 12. The guard member 17 is of such length that the front way 12 intermediate the turret slide 16 and the headstock 10 will always be covered or protected by the guard member even when the turret slide is moved to its most rearward position. A similar guard member 17a is secured to the left side of the turret 16 as viewed in Fig. 1 and extends over the front way 12 between the turret slide and the end of the bed. It will be understood that the guard member 17a is of such length as to always cover the front way 12 between the turret slide and the end of the bed even for the maximum movement of the turret slide toward the headstock.

The guard members 17 and 17a are provided on their inner sides with rearward extensions 18 and 18a which overlie a longitudinally extending shoulder 19 of the bed portion 14 and a guard member as will later be explained. The portion 14 of the bed adjacent to the shoulder 19 is provided with a lowered longitudinally extending shoulder 20 which supports the front longitudinal edge of a cover or guard plate 21, with the front edge of said cover or guard plate underlying the rear edge of the extensions 18 and 18a of the guard members 17 and 17a. The cover or guard plate 21 may be supported adjacent its rear edge by longitudinally spaced supporting ribs or posts 22 engaging the underside of the plate 21 and the top surface of the portion 14 of the bed. The plate 21 is fixed against endwise movement and extends the full length of the bed and beneath the turret slide 16 and has on its underside adjacent its rear edge a longitudinally extending channel 23. A guard member 24 for the rear way 13 is secured to the side of the turret slide adjacent the headstock and projects toward the headstock and through an opening formed therein. The guard member 24 is slidably supported on the rear inclined surface of the rear way 13 and has a portion extending downwardly alongside the vertical rear surface of the rear way and another portion extending toward the front of the bed and overlying the front inclined surface of the rear way. This latter portion of the guard member 24 is provided at its forward edge with an upturned flange extending into the channel 23 in the underside of the cover or guard plate 21. A guard member 24a similar to the guard member 24 is secured to the side of the turret slide adjacent to the end of the bed and overlies that portion of the rear way 13 which is between the turret slide and the end of the bed. The guard members 24 and 24a move with the turret slide and are of such length that the rear way 13 will be covered and protected thereby even during maximum movements of the turret slide in opposite directions. The guards or cover protecting the ways and the top of the bed intermediate the ways is substantially the same construction as is shown in my copending application Serial No. 585,717, filed March 30, 1945, now Patent 2,542,419, granted February 20, 1951.

It will be seen that the guards for the front way, the cover or guard plate 21 and the guard members for the rear way are in overlapping relationship and form a rearwardly and downwardly inclined surface over which flushing liquid can flow to flush chips, dirt and foreign matter to the rear over the rear way and beyond the rear side of the bed. An arrangement for providing the referred to flow of flushing liquid over the downwardly and rearwardly inclined surface will now be explained, but it will be understood that the arrangement now to be described could be advantageously used in conjunction with a machine tool wherein the bed and ways are not covered or protected as disclosed herein.

A pipe 25 extends the length of the bed adjacent to the front way 12 and through the lower part of the headstock 10 and the end of said pipe may be connected to a source of fluid under pressure. The cross slide carriage 15 and the turret slide 16 have fixedly mounted therein sleeves 26 which have a close sliding fit on the pipe 25 and act to support said pipe and also serve as valve sleeves in a manner later to be explained. The sleeves 26 are of such length as to extend from one side to the other side of the cross slide carriage 15 and the turret slide 16. The pipe 25 is provided, in this instance, on each side of its vertical center line with a longitudinal series of spaced openings 27, while the free end of the pipe at the end of the bed is closed.

It will be seen that as the cross slide carriage 15 and the turret slide 16 move along the bed the sleeves 26 will seal those openings 27 which are within the sleeves, while those openings 27 that are outside of the sleeves will be open and flushing fluid can flow outwardly thereof onto the rear side of the front way, onto the cover or guard plate 21 and over the rear guard member 24 and into a chip container (not shown). The pipe 25 beyond the headstock may be connected, for example, to the coolant circulating system for the machine tool to utilize the coolant as the flushing fluid.

It will be seen that the coolant or other flushing fluid will be forcefully sprayed onto the surfaces over the top of tht bed which are intermediate the cross slide carriage 15 and the headstock 10, intermediate said cross slide carriage and the turret slide 16 and said turret slide and the end of the bed irrespective of the movements of the cross slide carriage and the turret slide. Consequently there will be a flow of flushing fluid or coolant rearwardly and downwardly of the surface over the top of the bed from the front way to and beyond the rear way and such flow will flush chips, dirt and foreign matter off of the surface over the top of the bed and beyond the rear side thereof. It will also be seen that the movements of the cross slide carriage 15 and the turret slide 16 and the valve sleeves 26 automatically determine the openings 27 which are effectively in the spraying of the flushing fluid into the surface over the top of the bed, with the result that those portions of the surface where chips, dirt and foreign matter fall are being flushed at all times during the operation of the machine. Since the flushing fluid flows over the overlapping guard members and does not contact the ways, the lubricant for the ways is not removed by the flushing fluid.

In Figs. 4, 5 and 6 there is disclosed a different form of construction embodying the broad aspects of the invention as applied to smaller sizes of machine tools wherein the slide movements are less extensive. The machine tool disclosed in Figs. 4 to 6 inclusive is substantially the same in construction as in the previously described views and therefore the description of the same need not be repeated herein and the corresponding parts will be identified by the same reference characters.

A pipe 28 is secured by a bracket 29 to the stationary cover plate 21 adjacent the headstock end thereof and said pipe has a length extending substantially from the rear side of the front way 12 over the cover plate 21 and beyond the guard member 24 for the rear way 13. The pipe 28 then includes a downwardly extending length which is connected to an elbow fitting 30, as clearly shown in Fig. 4. The length of the pipe 28 which extends across the cover plate 21 is provided with longitudinally spaced openings 31 facing away from the headstock. The turret slide 16 on its side adjacent to the headstock has secured thereto by a bracket 32 an angular length of pipe 33 similar to the pipe 28 and provided with longitudinally spaced openings 34 directed toward the headstock. The rear end of the pipe 33 is connected to one end of a flexible length of hose 35, the opposite end of which is connected to a short length of pipe 36 which, in turn, is connected to the elbow 30. The elbow 30 is connected to a conduit 37 which extends to a source of supply of flushing liquid as, for instance, the coolant supply for the machine tool.

It will be seen that when liquid or coolant under pressure is flowing through the pipe 37 and pipes 28 and 33 said coolant or liquid will be discharged through the openings 31 and 34 over the guard 17, cover plate 21 and guard 24 and the discharged liquid or coolant will form a stream flowing rearwardly of the rearwardly inclined surface above the ways and bed, thus flushing chips, dirt and foreign matter from said surface toward and beyond the rear way where they may collect in a container (not shown). It will also be seen that the pipe 33 moves with the turret slide, it being recalled that a flexible length of hose 35 connects the pipe 33 with the short length of pipe 36. Therefore the limited forward and backward movements of the turret slide along the bed in the smaller type machine results in an effective flushing of the surface over the bed irrespective of the position of the turret slide. Although no cross slide carriage or cross slide has been shown in Figs. 4 to 6 inclusive, it will be understood that such carriage and cross slide can be mounted on the bed in any well known manner as, for instance, that indicated in Fig. 1, and if desired said cross slide carriage on one or both of its opposite sides can be provided with pipes similar to the pipes 28 and 33 and said pipes can be connected to a source of liquid supply by means of flexible connections. Likewise, a pipe similar to pipe 33 may be secured to the side of the turret slide that is remote from the headstock and said pipe also could be connected to the liquid supply source.

Although several embodiments of the invention have been illustrated and described herein it will be understood that the invention is susceptible of various modifications and adaptations within the scope of the appended claims.

Having thus described my invention, I claim:

1. In a machine tool having a bed provided with ways, a slide movable on said ways, a conduit extending over said bed longitudinally thereof intermediate said ways and adapted to be connected with a fluid supply source, said conduit being provided with a series of longitudinally spaced openings, and a sleeve carried by said slide and movably interfitting said conduit and successively sealing and uncovering different ones of said openings as said slide moves along said ways.

2. In a machine tool having a bed provided with ways, slides movable on said ways, a conduit adapted to be connected to a fluid supply source and extending longitudinally of said bed over the top thereof and through said slides and provided with longitudinally spaced openings, and means carried by each of said slides and movable over said conduit during movement of said slides to seal and uncover certain of said openings.

3. In a machine tool having a bed provided with longitudinally extending front and rear ways, slides movable on said ways, guard members for said ways, a guard plate for the top of the bed intermediate said ways, said guard members and said guard plate having overlapping longitudinal edges and forming a continuous surface rearwardly declined from the front way to and beyond the rear way, a conduit extending longitudinally of the bed adjacent the rear side of the front way and adapted to be connected to a fluid supply source, said conduit being provided with longitudinally spaced openings, said slides being provided with sleeves movable therewith and extending therethrough and slidably interfitting said conduit and acting as valves during slide movements to successively seal and uncover certain of said openings.

JAMES R. LONGSTREET.

References Cited in the file of this patent

UNITED STATES PATENTS

| Number | Name | Date |
|---|---|---|
| 179,318 | Jenks | June 27, 1876 |
| 406,003 | Reiss | June 25, 1889 |
| 1,211,840 | Hanson | Jan. 9, 1917 |
| 1,832,104 | Drake | Nov. 17, 1931 |
| 2,542,419 | Longstreet | Feb. 20, 1951 |